US010078480B1

United States Patent
Arriola

(10) Patent No.: US 10,078,480 B1
(45) Date of Patent: Sep. 18, 2018

(54) IMAGE FORMING APPARATUS AND CONTROL METHOD FOR IMAGE FORMING APPARATUS

(71) Applicant: KYOCERA Document Solutions Inc., Osaka (JP)

(72) Inventor: Dennis Arriola, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/631,365

(22) Filed: Jun. 23, 2017

(30) Foreign Application Priority Data

Jun. 15, 2017 (JP) .................. 2017-117791

(51) Int. Cl.
*G06K 9/00* (2006.01)
*G06F 3/12* (2006.01)
*G03G 15/00* (2006.01)
*H04N 1/00* (2006.01)

(52) U.S. Cl.
CPC ....... *G06F 3/1294* (2013.01); *G03G 15/5087* (2013.01); *H04N 1/00923* (2013.01); *H04N 1/00204* (2013.01); *H04N 2201/0094* (2013.01)

(58) Field of Classification Search
CPC ................................................. G03G 15/5087
See application file for complete search history.

(56) References Cited

U.S. PATENT DOCUMENTS

| 6,970,259 B1* | 11/2005 | Lunt ..................... G06F 21/608 358/1.14 |
| 2006/0242418 A1* | 10/2006 | Willamowski ........ G06T 1/0071 713/176 |
| 2009/0324100 A1* | 12/2009 | Kletter ............... G06K 9/00442 382/217 |
| 2010/0266163 A1* | 10/2010 | Evevsky ................ G06K 9/036 382/112 |

FOREIGN PATENT DOCUMENTS

JP 2003-69803 A 3/2003

* cited by examiner

*Primary Examiner* — Oneal R Mistry
(74) *Attorney, Agent, or Firm* — Stein IP, LLC

(57) ABSTRACT

The image forming apparatus includes a communication unit, a sheet feed unit, a printing part, a storage unit, an operation part, and a control unit. With an economy mode set, the control unit selects, as first document data, one piece of document data out of document data stored in the storage unit. The control unit makes a comparison between the first document data and newly received second document data. The control unit recognizes a missing portion that is present in the second document data but absent in the first document data. The control unit generates missing-and-added image data for printing of only the missing portion. The control unit instructs for feeding sheets of a set printed matter based on the first document data and for executing printing based on the missing-and-added image data.

12 Claims, 7 Drawing Sheets

FIG.7
BEFORE CORRECTION
FIG.8
AFTER CORRECTION
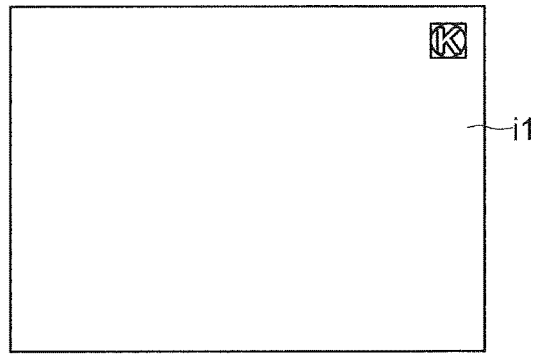
FIG.9

IMAGE FORMING APPARATUS AND CONTROL METHOD FOR IMAGE FORMING APPARATUS

INCORPORATION BY REFERENCE

This application is based upon and claims the benefit of priority from the corresponding Japanese Patent Application No. 2017-117791 filed on Jun. 15, 2017, the entire contents of which are incorporated herein by reference.

BACKGROUND

The present disclosure relates to an image forming apparatus for supplying set-up paper sheets and performing printing thereon.

Image forming apparatuses perform printing with use of color materials. Image forming apparatuses generate image data on a basis of input data. Image forming apparatuses perform printing on a basis of generated image data. Among image forming apparatuses are those which perform processing and editing of image data. There has been known an example of copiers for processing image data as described below.

Heretofore, there has been described a copier which works as follows. That is, after reading of a document and temporary storage of input data, the input data is analyzed for analysis as to presence of an arbitrarily set specific character string or specific image such as signets, 'Confidential,' and 'Secret.' When the document is decided to be one including the specific character string or the specific image, the copier suppresses copying of only the specific character string portion and the specific image portion. With this constitutional function, the copier is intended to automatically edit arbitrarily set character string portions and image portions.

The image forming apparatus may be used as a printer. A user prepares a document (file) on a computer by using software. The user uses, for example, word processing software or spreadsheet software to prepare a document. To print the prepared document, the user executes a print command on the software. The command execution causes data for document printing (document data) to be transmitted from the computer to the image forming apparatus. The image forming apparatus carries out printing on a basis of the document data. The user obtains a printed matter based on the document data.

The document may be misprinted. For example, the user may print a document with necessary characters or graphics omitted (with the document uncompleted). Also, the user may start printing on a misperception that the document has been completed. That is, a document missing information necessary for completion is printed. After the printing, the user performs correction to add necessary information into sentences. Then, the user prints the corrected document once again. Thus, a completed document is obtained.

A misprinted document results in a waste. There is a problem that paper sheets or color materials (toner and ink) are wastefully consumed. Misprints may occur to not a few times. The more the number of times of misprint occurrence increases, the more the paper sheets and color materials are consumed wastefully.

The above-described known art relates to documents containing signets, 'Confidential' or 'Secret' characters. Even when any of these characters is contained in the document, the art makes it possible to obtain copied matters (printed matters obtained by copying or duplication) containing none of those characters. However, the art is incapable of solving such problems as wasteful consumption of paper sheets or color materials due to misprints.

SUMMARY

An image forming apparatus in an aspect of the present disclosure includes a communication unit, a printing part, a storage unit, an operation part, and a control unit. The communication unit receives document data. The printing part includes a sheet feed unit for feeding out sheets of paper one by one. The printing part, on a basis of the document data, executes printing on a sheet fed from the sheet feed unit. The storage unit stores, in nonvolatile fashion, the document data received by the communication unit. The operation part accepts an operation. With an economy mode set, the control unit selects, as first document data, one piece of the document data out of pieces of the document data stored in the storage unit. The control unit makes a comparison between the first document data and second document data newly received by the communication unit. The control unit recognizes, out of the second document data, a missing portion that is present in the second document data but absent in the first document data. The control unit generates missing-and-added image data for printing of only the missing portion. The control unit instructs the sheet feed unit to feed sheets of a set printed matter based on the set first document data, and instructs the printing part to execute printing based on the missing-and-added image data.

Further features and advantages of the present disclosure will become apparent from the description of an embodiment given below.

BRIEF DESCRIPTION OF THE DRAWINGS

FIG. 7 is a view showing an example of information addition to a printed matter in the economy mode according to the embodiment;

FIG. 8 is a view showing an example of information addition to the printed matter in the economy mode according to the embodiment;

FIG. 9 shows an example of missing-and-added image data according to the embodiment.

DETAILED DESCRIPTION

The present disclosure is intended to avoid wasteful use of paper sheets and color materials with reuse of documents from which information is missing. Hereinbelow, an embodiment of the disclosure will be described with reference to FIGS. 1 to 10. In the following description, a multifunction peripheral 100 will be taken as an example of the image forming apparatus. Individual constituent elements such as structures and placements described in this embodiment should be construed as an explanatory example only, and in no sense limitative in terms of the scope of the disclosure.

(Multifunction Peripheral 100)

Figure 1:
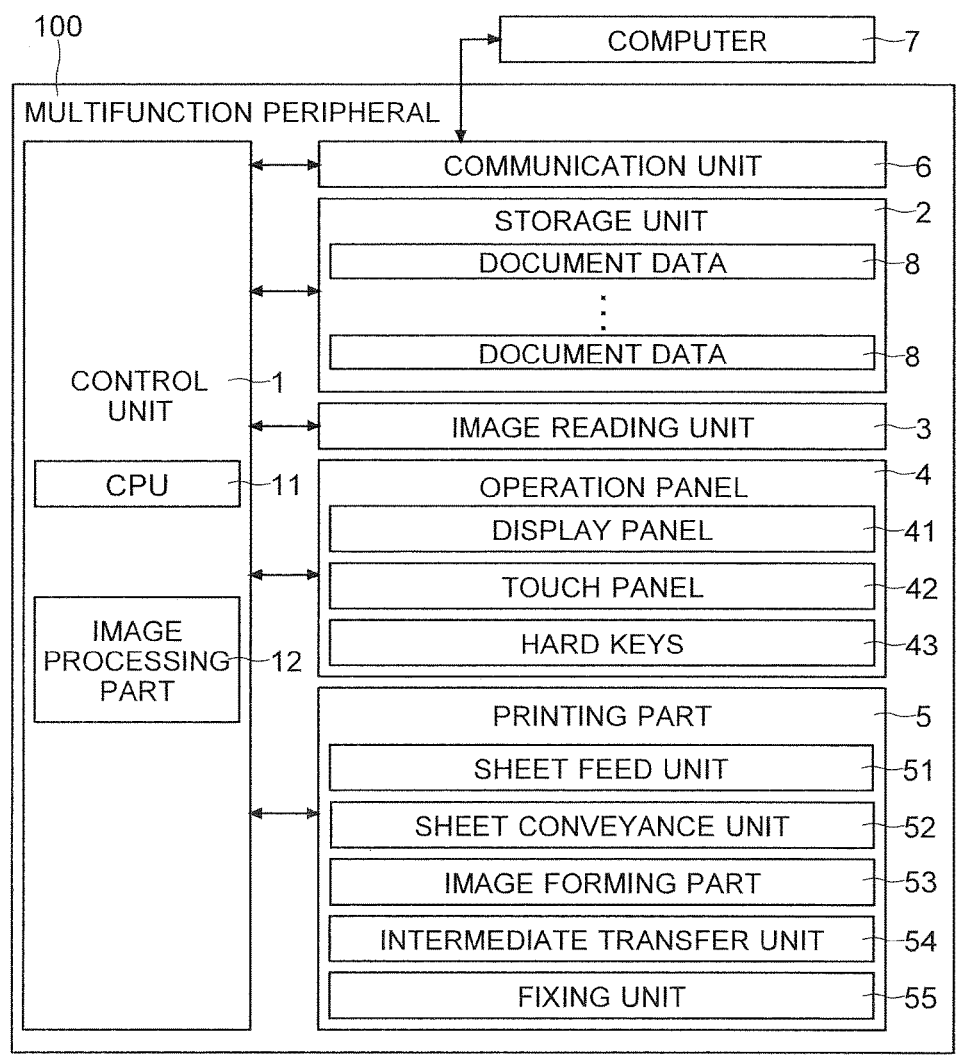
FIG. 1 is a diagram showing an example of a multifunction peripheral according to an embodiment.

An example of the multifunction peripheral 100 according to the embodiment will be described with reference to FIG. 1. The multifunction peripheral 100 includes a control unit 1, a storage unit 2, an image reading unit 3, an operation panel 4, a printing part 5, and a communication unit 6.

The control unit 1 controls operations of the multifunction peripheral 100. The control unit 1 includes a CPU 11 and an image processing part 12. The storage unit 2 includes ROM, RAM and a storage. The storage is such a storage unit of large capacity as an HDD or an SSD. The storage unit 2 stores therein various types of data and control programs. For example, the storage unit 2 stores control data, setting data 8b, and image data. The CPU 11 controls individual parts (image reading unit 3, operation panel 4, printing part 5, communication unit 6) on a basis of the programs and data stored in the storage unit 2. The image processing part 12 performs various types of image processing. For example, the image processing part 12 is given as a circuit (ASIC) for exclusive use of image processing.

For reading of a document, the control unit 1 instructs the image reading unit 3 to read the document. The image reading unit 3 generates image data of the document. For the purpose of document reading, the image reading unit 3 includes a light source (lamp), a lens, and an image sensor (line sensor). The image reading unit 3 includes an image data generation circuit for generating image data on a basis of an output of the image sensor. The image data generation circuit converts analog outputs of individual pixels of the image sensor to digital values. The image reading unit 3 is compatible with reading in color. Therefore, the image reading unit 3 includes line sensors corresponding to a plurality of colors.

The operation panel 4 includes a display panel 41, a touch panel 42 (corresponding to operation part), and hard keys 43 (corresponding to operation part). The display panel 41 displays screens and images thereon. The control unit 1 controls the display of the display panel 41. The control unit 1 instructs the display panel 41 to display an operational image to be used for job setting. The operational image is, for example, buttons and keys. The touch panel 42 accepts an operation by a user. The touch panel 42 is provided on top of the display panel 41. The touch panel 42 recognizes a touch position. Based on an output of the touch panel 42, the control unit 1 recognizes a user-operated operational image. Based on the operated operational image, the control unit 1 recognizes a content of the user's operation. The hard keys 43 also accept a user's operation. For example, a start key may be provided as a hard key 43. The start key is a key for use of instruction for a job execution start.

The printing part 5 includes a sheet (paper) feed part 51, a sheet conveyance unit 52, an image forming part 53, an intermediate transfer unit 54, and a fixing unit 55. Sheets of paper are to be set in the sheet feed unit 51. The sheet feed unit 51 includes a sheet feed roller, and a set part in which sheets are to be set. The sheet feed roller is to make contact with one sheet out of the set sheets. The sheet feed unit 51 makes the sheet feed roller rotated. By this operation, sheets set in the sheet feed unit 51 are to be fed out.

For printing, the control unit 1 instructs the sheet feed unit 51 to supply a paper sheet. The control unit 1 instructs the sheet conveyance unit 52 convey the sheet. The control unit 1 instructs the image forming part 53 to form a toner image based on image data. Because of color printing, the image forming part 53 includes a plurality of image forming units. For example, the image forming part 53 includes an image forming unit for forming black toner images, an image forming unit for forming cyan toner images, an image forming unit for forming yellow toner images, and an image forming unit for forming magenta toner images. The control unit 1 instructs the intermediate transfer unit 54 to transfer toner images of individual colors formed by the image forming part 53 onto the sheet. The control unit 1 instructs the fixing unit 55 to fix the toner images transferred onto the sheet. The control unit 1 instructs the sheet conveyance unit 52 to discharge the fixation-processed sheet outward of the apparatus.

The communication unit 6 performs communications with a computer 7. The communication unit 6 includes a connector, a communication circuit, and communication memory. The communication unit 6 receives document data 8 (detailed later) from the computer 7. The control unit 1 instructs the printing part 5 to carry out printing on a basis of the received document data 8 (print job).

(Computer 7 and Document Data 8)

Figure 2:
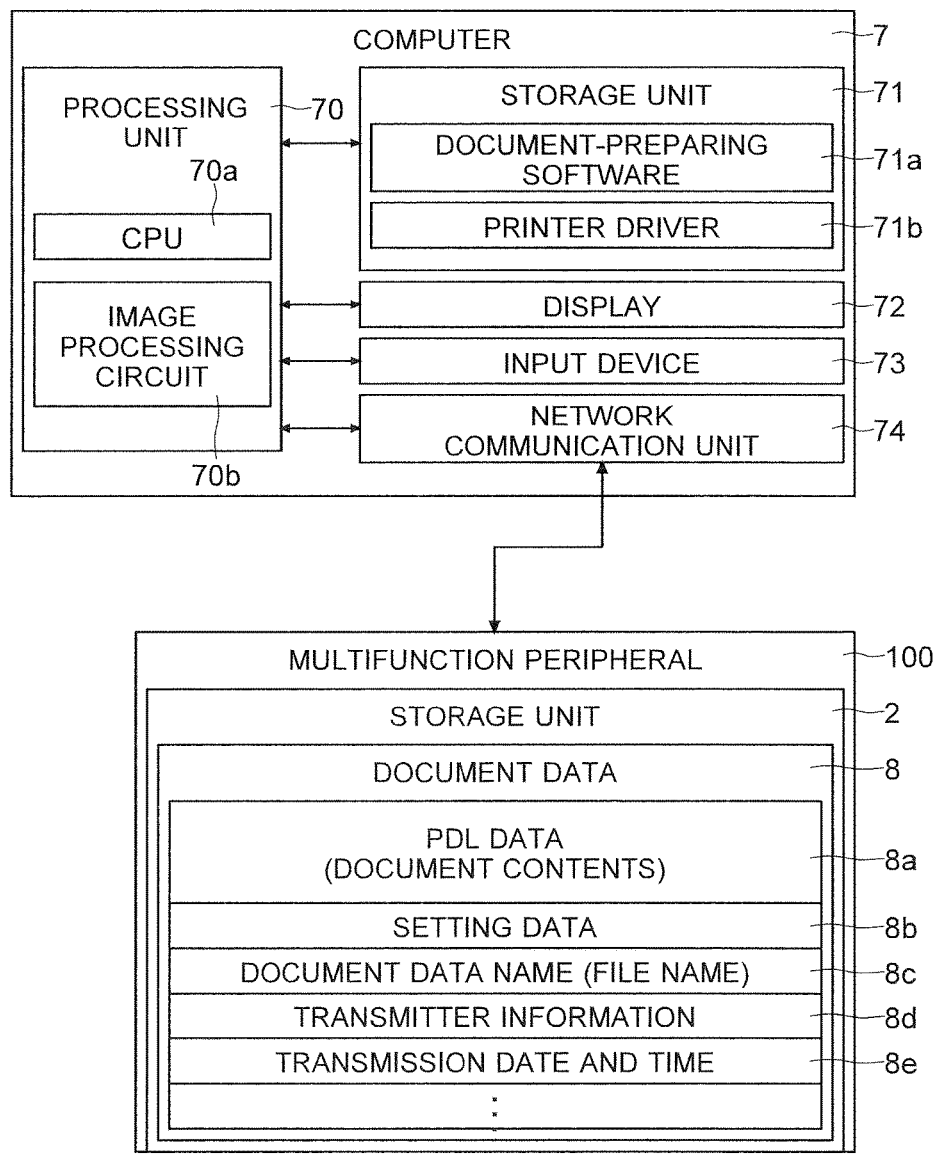
FIG. 2 is a diagram showing an example of a computer according to the embodiment.

Next, an example of the computer 7 according to this embodiment will be described with reference to FIG. 2. The computer 7 is communicatably connected with the communication unit 6. The computer 7 connected to the communication unit 6, without being limited to one in quantity, may be provided in plurality. For convenience' sake, FIG. 2 shows only one computer 7. The computer 7 is a PC (Personal Computer) or a server. Below described is an example in which a PC is used as the computer 7. In addition, the computer 7 has only to be enabled to prepare document data 8 and transmit the document data 8 to the multifunction peripheral 100. For example, the computer 7 may also be a smartphone or a tablet terminal.

The computer 7 includes a processing unit 70, a storage unit 71, a display 72, an input device 73, and a network communication unit 74.

The processing unit 70 controls operations of the computer 7. For example, the processing unit 70 is provided as a board including a CPU 70a and an image processing circuit 70b. The processing unit 70 controls operations of the computer 7 on a basis of the OS, software, and data. The image processing circuit 70b performs image processing for image data. The storage unit 71 includes ROM, RAM, and a storage. The storage is a storage device of large capacity such as an HDD or an SSD. The storage unit 71 stores therein the OS, programs, software, and data of the computer 7 in nonvolatile fashion. The processing unit 70 controls the individual parts of the computer 7 according to storage contents of the storage unit 71.

The display 72 displays various types of information on request from the processing unit 70. The display 72 is a panel serving for display such as a liquid crystal panel or an organic EL (Electro-Luminescent) panel. The input device 73 is a device for accepting a user's operation. The input device 73 is connected to the processing unit 70. The input device 73 includes, for example, a keyboard. Based on an output of the keyboard, the processing unit 70 recognizes an operated key. The input device 73 also includes a pointing device (e.g., mouse). The display 72 displays operation-dedicated images. The operation-dedicated images are, for example, icons, buttons, keys, and tabs. Based on an output of the pointing device, the processing unit 70 recognizes an operated operation-dedicated image.

The network communication unit 74 includes a communication circuit, and communication software. The network communication unit 74 communicates with the communication unit 6 of the multifunction peripheral 100 in response to an instruction from the processing unit 70. For printing, the network communication unit 74 transmits document data 8 toward the communication unit 6 of the multifunction peripheral 100.

The storage unit 71 of the computer 7 includes a document-preparing software 71a. In other words, document-preparing software 71a is installed on the computer 7. For example, the document-preparing software 71a is word processing software, spreadsheet software, or image-data editing software. Browsing software for building pages to be displayed on the display 72 on a basis of downloaded data and generating viewable documents can also be regarded as a kind of document-preparing software 71a. Further, the storage unit 71 of the computer 7 includes a printer driver 71b. In other words, a printer driver 71b is installed on the computer 7. The printer driver 71b is a piece of software for printing with the multifunction peripheral 100.

For printing of a document prepared by the document-preparing software 71a, the user executes a print command on the document-preparing software 71a. The input device 73 accepts the execution of the print command. Upon execution of the print command, the processing unit 70 prepares document data 8 on the basis of the printer driver 71b. The processing unit 70 instructs the network communication unit 74 to transmit the prepared document data 8 toward the communication unit 6 of the multifunction peripheral 100. The control unit 1 of the multifunction peripheral 100 instructs the printing part 5 to print out based on the received document data 8. Thus, the user obtains a printed matter in which the prepared document is described.

FIG. 2 shows an example of the document data 8. For example, the document data 8 contains PDL data 8a, setting data 8b, a document data name 8c, transmitter information 8d, and transmission date and time 8e.

On the basis of the printer driver 71b, the processing unit 70 generates the PDL data 8a in which document contents (printing contents) are described in a page description language. The processing unit 70 makes the setting data 8b, which includes set values set by the user, contained in the document data 8. The processing unit 70 also makes the document name (document data name 8c) contained in the document data 8. For example, the processing unit 70 takes a file name on the document-preparing software 71a as a document data name 8c. The processing unit 70 also makes transmitter information 8d contained in the document data 8. The transmitter information 8d is data indicative of a transmitter (computer 7) of the document data 8. For example, a path or an IP address of the computer 7, which transmits the document data 8, may be assigned as the transmitter information 8d. The transmitter information 8d may otherwise be the name of the computer 7. Furthermore, the processing unit 70 makes transmission date and time 8e contained in the document data 8. The processing unit 70 includes a clock circuit (not shown) for recognition of the transmission date and time 8e.

(Addition in Economy Mode)

Next, an example of the economy mode of the multifunction peripheral 100 according to this embodiment will be described with reference to FIGS. 3 to 9.

Figure 3:
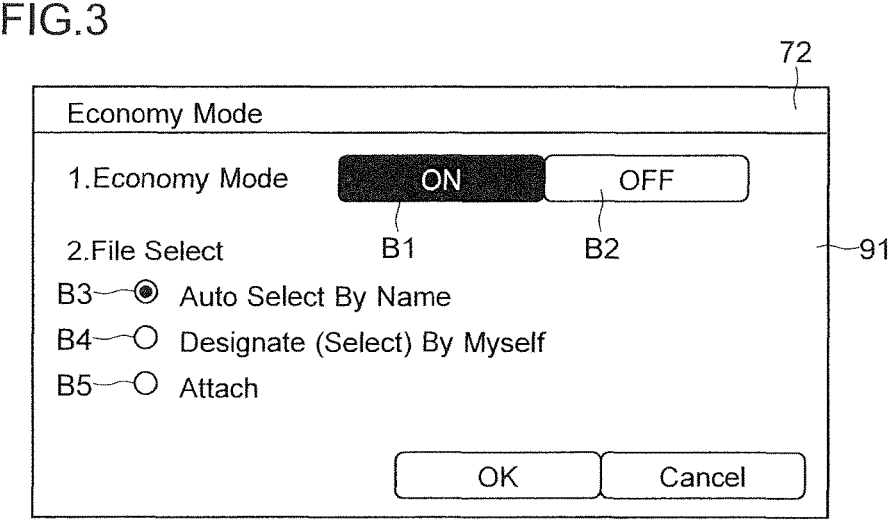
FIG. 3 is a view showing an example of an economy mode setting screen according to the embodiment.

The multifunction peripheral 100 has an economy mode. The economy mode can be set and canceled on the computer 7. FIG. 3 shows an example of an economy mode setting screen 91 (economy mode setting window) to be displayed on the display 72 of the computer 7. When a specified operation is applied to the input device 73, the processing unit 70 of the computer 7 instructs the display 72 to display the economy mode setting screen 91. An ON button B1 and an OFF button B2 are disposed in the economy mode setting screen 91. The ON button B1 is a button for setting the multifunction peripheral 100 to the economy mode. The OFF button B2 is a button for canceling the economy mode of the multifunction peripheral 100.

When the ON button B1 is operated, the processing unit 70 instructs the network communication unit 74 to transmit a transition-to-economy-mode instruction toward the communication unit 6. Upon receiving the transition instruction, the control unit 1 sets the multifunction peripheral 100 to the economy mode (under control in the economy mode). By using a program related to the economy mode, the control unit 1 controls the multifunction peripheral 100. When the OFF button B2 is operated, the processing unit 70 instructs the network communication unit 74 to transmit an economy-mode cancellation instruction toward the communication unit 6. Upon receiving the cancellation instruction, the control unit 1 cancels the economy mode. When the economy mode is canceled, the control unit 1 moves on to a normal mode.

Figure 4:
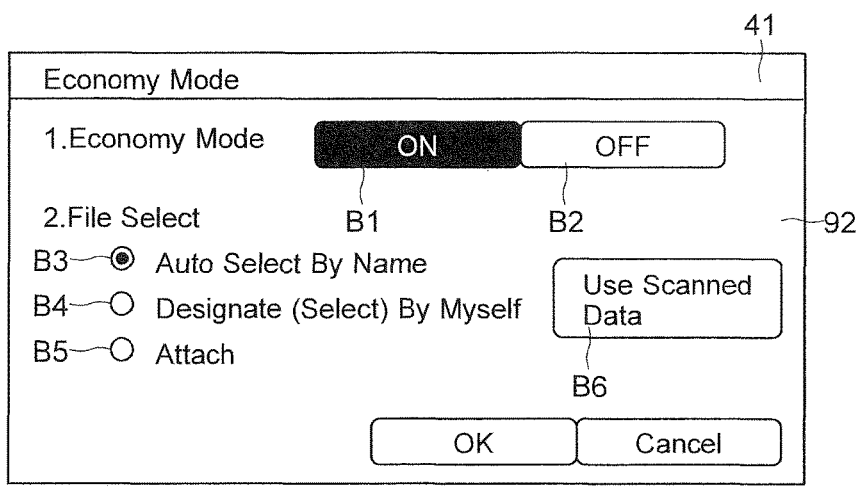
FIG. 4 is a view showing an example of the economy mode setting screen according to the embodiment.

The setting and cancellation of the economy mode may also be executed on the operation panel 4. FIG. 4 shows an example of an economy mode setting screen 92 to be displayed on the display panel 41 of the multifunction peripheral 100. When a specified operation is applied to the touch panel 42 or the hard keys 43, the control unit 1 instructs the display panel 41 to display the economy mode setting screen 92. An ON button B1 and an OFF button B2 are also disposed in the economy mode setting screen 92. When the ON button B1 is operated, the control unit 1 sets the multifunction peripheral 100 to the economy mode (under control in the economy mode). By using a program related to the economy mode, the control unit 1 controls the multifunction peripheral 100. When the OFF button B2 is operated, the control unit 1 cancels the economy mode. When the economy mode is canceled, the control unit 1 moves on to the normal mode (under control in the normal mode).

It is also allowable that when printing is executed in the economy mode, the control unit 1 automatically cancels the economy mode. In this case, the user makes a setting for utilizing the economy mode on each occasion of utilizing the economy mode. It is further allowable that the control unit 1 maintains the set economy mode until the OFF button B2 is operated on the computer 7 or the operation panel 4.

Figure 5:
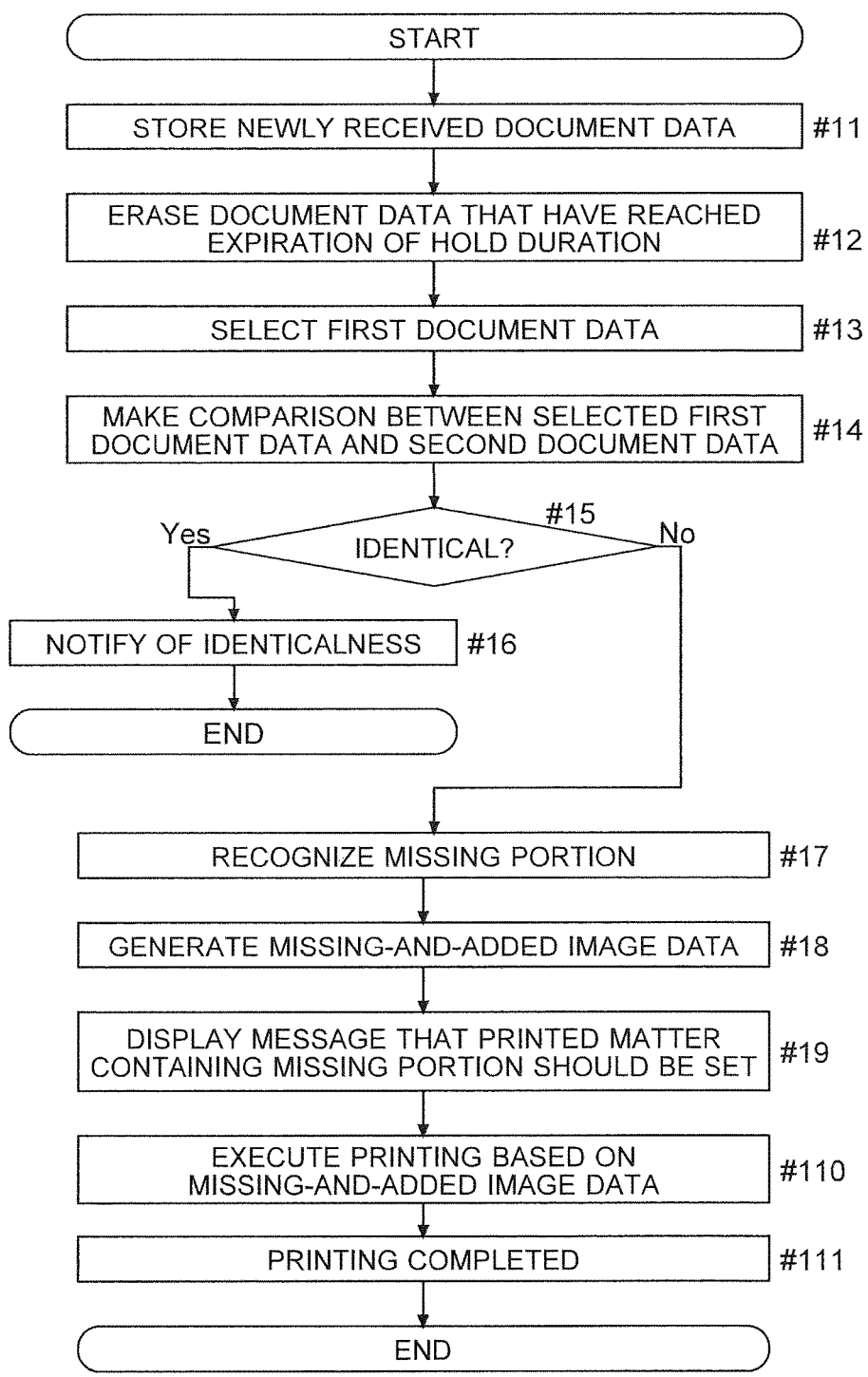
FIG. 5 is a flowchart showing an example of a processing flow in the economy mode according to the embodiment.

In the economy mode, it is enabled to add only a missing portion P1 (a portion added for correction) to a printed matter already outputted by the printing part 5. It is enabled, with reuse of an information-missing printed matter, to obtain a completed document. Hereinbelow, a processing flow in the economy mode will be described with reference to FIGS. 3 to 6. A start in the flowchart of FIG. 5 is a time point when the communication unit 6 receives the document data 8 in a state of the economy mode.

First, the control unit 1 makes newly received document data 8 stored in the storage unit 2 in nonvolatile fashion (step #11). The newly received document data 8 is stored in the storage of the storage unit 2. In addition, whichever the economy mode has been set or canceled, the control unit 1 makes the newly received document data 8 stored in the storage unit 2.

Next, the control unit 1 instructs the storage unit 2 to erase pieces of document data 8 that have reached expiration of a predetermined hold duration since their transmission (step #12). The control unit 1 checks for transmission date and time 8e contained in the individual pieces of document data 8. The control unit 1 checks for pieces of document data 8 that have reached expiration of the hold duration since their transmission date and time 8e, out of the stored pieces of document data 8. The control unit 1 automatically deletes obsolete pieces of document data 8. The length of the hold duration can be set on the operation panel 4. For example, the hold duration may be determined as a length within a range of several days to several months.

From among the pieces of document data 8 in the storage unit 2, the control unit 1 selects a piece of document data 8 (first document data 81) corresponding to the newly received document data 8 (step #13). Hereinafter, newly received document data 8 will be referred to as second document data 82. The user is allowed to set selection means for the first document data 81. The user is also allowed to select a selection means. The user is allowed to set the selection means on the computer 7 and the operation panel 4.

FIG. 3 shows an example of the economy mode setting screen 91 to be displayed on the computer 7. FIG. 4 shows an example of the economy mode setting screen 92 to be displayed on the operation panel 4. In each of the economy mode setting screens 91 and 92, an auto selection button B3, a data designation button B4, and an attach button B5 are provided. In order to automatically select the first document data 81 on the basis of the document data name 8c, the user operates the auto selection button B3. When the auto selection button B3 is operated on the computer 7, the processing unit 70 instructs the network communication unit 74 to transmit, toward the communication unit 6, an event that the auto selection button B3 has been operated. When the auto selection button B3 is operated on the operation panel 4, the control unit 1 recognizes that the auto selection button B3 has been operated. When the document data name 8c is unchanged before and after the correction, the user may appropriately operate the auto selection button B3.

When the auto selection button B3 is operated, the control unit 1 selects, as the first document data 81, a piece of document data 8 having the same name as the document data name 8c of the second document data 82 from among the pieces of document data 8 stored in the storage unit 2. As described above, the document data name 8c (file name) is contained in each piece of the document data 8. The control unit 1 selects the first document data 81 by looking up to information as to the document data name 8c contained in the individual pieces of the document data 8.

When the user by himself/herself designates the document data 8 to be assigned as the first document data 81, the user operates the data designation button B4. When the data designation button B4 is operated on the computer 7, the processing unit 70 instructs the display 72 to display a data designation screen 93. Also when the data designation button B4 is operated on the operation panel 4, the control unit 1 instructs the display panel 41 to display the data designation screen 93.

For displaying the data designation screen 93 on the computer 7, the processing unit 70 instructs the network communication unit 74 to transmit a transmission request of information as to the individual pieces of document data 8 toward the communication unit 6. Upon receiving the transmission request, the control unit 1 instructs the communication unit 6 to transmit information (document data name 8c, transmitter information 8d, transmission date and time 8e, etc.) as to the individual pieces of document data 8 in the storage unit 2 toward the network communication unit 74.

Figure 6:
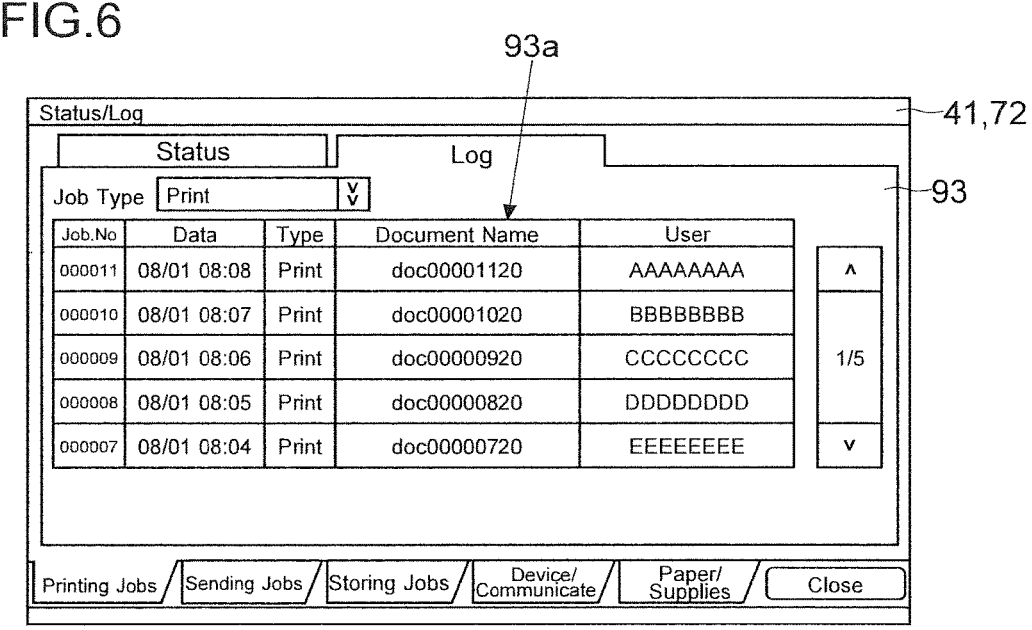
FIG. 6 is a view showing an example of a document data designation screen according to the embodiment.

FIG. 6 shows an example of the data designation screen 93. The data designation screen 93 includes a document list 93a. Information as to a piece of document data 8 stored in the storage unit 2 is described on each row of the document list 93a. The user operates a row of document data 8 that the user intends to designate. The piece of document data 8 corresponding to the operated row is designated as the first document data 81. When the document data 8 is designated on the computer 7, the processing unit 70 instructs the network communication unit 74 to transmit designation data indicative of the designated document data 8 toward the communication unit 6. When the designation data is received by the communication unit 6, the control unit 1 selects the designated document data 8 as the first document data 81. The control unit 1 also selects, as the first document data 81, document data 8 designated by operation of the touch panel 42.

For assigning, as the first document data 81, document data 8 attached to the second document data 82, the user operates the attach button B5. When the attach button B5 is operated on the computer 7, the processing unit 70 instructs the network communication unit 74 to transmit, toward the communication unit 6, an event that the attach button B5 has been operated. When the attach button B5 is operated on the operation panel 4, the control unit 1 recognizes that the attach button B5 has been operated.

When the attach button B5 is operated, the control unit 1 does not select any piece of document data 8 stored in the storage unit 2 as the first document data 81. The control unit 1 selects, as the first document data 81, another piece of document data 8 attached to the second document data 82. For transmission of document data, the user sets the second document data 82 as well as data (first document data 81) to be attached to the second document data 82.

It is also allowable that image data (document image data) acquired by reading a document may be assigned as the first document data 81. In this case, there is a need for reading the document. The document needs to be set to the multifunction peripheral 100. Therefore, a scan button B6 is provided only in the economy mode setting screen 92 (see FIG. 4) of the operation panel 4. In the economy mode setting screen 91 (see FIG. 3) to be displayed on the display 72, no scan button B6 is displayed. That is, the touch panel 42 and the hard keys 43 of the operation panel 4 accept an instruction for comparison with the document image data.

When the scan button B6 is operated (when a comparison instruction is given), the control unit 1 may instruct the display panel 41 to display a message that a printed matter containing a missing portion P1 (a printed matter to be reused, a printed matter to which information is to be added) should be set. Then, the control unit 1 instructs the image reading unit 3 to read the printed matter containing the missing portion P1. The control unit 1 makes image data (document image data), which has been acquired from reading by the image reading unit 3, stored in the storage unit 2. Upon issue of a comparison instruction, the control unit 1, as to the second document data 82 next received by the communication unit 6, selects latest-generated document image data as the first document data 81.

Next, the control unit 1 makes a comparison between the selected first document data 81 and the second document data 82 (step #14). The control unit 1 makes a comparison between image data generated based on PDL data 8a of the first document data 81 and image data generated based on PDL data 8a of the second document data 82. The image processing part 12 generates image data based on PDL data 8a. In addition, when the scan button B6 is operated, the control unit 1 makes a comparison between the image data (comparison-dedicated image data) generated based on the PDL data 8*a* of the second document data 82 and the document image data (first document data 81). Otherwise, the control unit 1 may make a comparison between the PDL data 8*a* of the first document data 81 and the PDL data 8*a* of the second document data 82.

Based on the comparison, the control unit 1 decides whether or not the first document data 81 and the second document data 82 are identical to each other (step #15). For example, when there is no difference between the pieces of image data generated based on the pieces of PDL data 8*a*, respectively, the control unit 1 decides that the first document data 81 and the second document data 82 are identical to each other. When there is any difference between those pieces of image data, the control unit 1 decides that the first document data 81 and the second document data 82 are different from each other.

Otherwise, when there is no difference between both pieces of PDL data 8*a*, the control unit 1 may decide that the first document data 81 and the second document data 82 are identical to each other. When there is any difference between both pieces of document data 8, the control unit 1 may decide that the first document data 81 and the second document data 82 are different from each other.

Upon a decision of identicalness (Yes at step #15), the control unit 1 issues a notification that the first document data 81 and the second document data 82 are identical to each other (step #16). For example, the control unit 1 transmits, toward the computer 7 that has transmitted the second document data 82, a notification that both pieces of document data 8 are identical to each other. Otherwise, the control unit 1 may make the display panel 41 display the notification that both pieces of document data 8 are identical to each other. Thus, this processing flow is ended. As a result, the control unit 1 blocks the printing part 5 from printing for addition of only the missing portion P1.

Upon a decision of differentness (No at step #15), the control unit 1 recognizes, out of the second document data 82, the same portion as the first document data 81 as well as the missing portion P1 that is present in the second document data 82 but absent in the first document data 81 (step #17).

For example, the control unit 1 divides image data, which has been generated based on the PDL data 8*a* of the second document data 82, into regions identical to image data or document image data generated based on the PDL data 8*a* of the first document data 81 and regions different therefrom. The control unit 1 recognizes a region classified into differentness as a missing portion P1. Otherwise, the control unit 1 may identify, as a missing portion P1, a different portion from the PDL data 8*a* of the first document data 81 out of the PDL data 8*a* of the second document data 82.

FIGS. 7 and 8 are views showing an example of the recognition of the missing portion P1 as well as the addition of the missing portion P1. Described with FIGS. 7 and 8 is an example in which the missing portion P1 is a logotype. FIG. 7 shows contents of the document data 8 in which the missing portion P1 is contained. That is, FIG. 7 shows document data 8 (first document data 81) prior to correction. FIG. 8 shows contents of the document data 8 in which information has been added. FIG. 8 shows the document data 8 (second document data 82) subsequent to correction.

As shown in FIG. 7, the logotype is missing in upper portion of the document data 8. Meanwhile, the document data 8 of FIG. 8 has been corrected for addition of the logotype. That is, the first document data 81 and the second document data 82 are partly identical to each other. In the second document data 82, information absent in the first document data 81 has been added. The control unit 1 recognizes the portion, which has been added to the first document data 81, out of the second document data 82 as the missing portion P1. The control unit 1 recognizes the portion surrounded by broken line in FIG. 8 as the missing portion P1.

For example, the control unit 1 may recognize an added graphic like a logotype as the missing portion P1. The control unit 1 may recognize a linear graphic like an underline as the missing portion P1. The control unit 1 may recognize a character string added in a predetermined header area (belt area of a specified width on page upside) as the missing portion P1. The control unit 1 may recognize a character string added in a predetermined footer area (belt area of a specified width on page underside) as the missing portion P1.

The control unit 1 generates missing-and-added image data i1 for printing of only the missing portion P1 (step #18). FIG. 9 shows an example of the missing-and-added image data i1. For example, based on the PDL data 8*a* of the second document data 82, the control unit 1 generates image data of the second document data 82. Then, the control unit 1 generates image data in which pixel values of pixels have been converted to white color except for the missing portion P1 (region recognized as the missing portion P1), out of the image data of the second document data 82. When printing is executed based on the generated image data, only the missing portion P1 is printed. The control unit 1 takes the image data as the missing-and-added image data i1.

Then, the control unit 1 instructs the display panel 41 to display a message that a printed matter containing the missing portion P1 (a printed matter of the first document data 81, a printed matter to be reused, a printed matter to which information is to be added) should be set (step #19). In this case, the control unit 1 may instruct the display panel 41 to display a printing start button together with the message. Even when the user has failed to set the printed matter containing the missing portion P1 on the sheet feed unit 51, the user can be aware of the failure. Then, the control unit 1 instructs the printing part 5 to execute printing based on the missing-and-added image data i1 (step #110). In addition, the control unit 1 may make the printing part 5 start printing when an operation on the printing start button is accepted by the touch panel 42.

More specifically, the control unit 1 instructs the sheet feed unit 51 to feed a paper sheet of the set printed matter containing the missing portion P1 (printed matter of the first document data 81). Also, the control unit 1 instructs the image forming part 53 to form a toner image based on the missing-and-added image data i1 and transfer the toner image onto the printed matter. The fixing unit 55 makes the toner image of the missing portion P1 fixed onto the printed matter. As a result, a printed matter in which the missing portion P1 has been added can be obtained. That is, a completed printed matter can be obtained by addition of necessary information. Then, printing on the printed matter containing the missing portion P1 is completed (step #111). Thus, the processing flow is ended (END).

(Processing with the Economy Mode Canceled)

Figure 10:
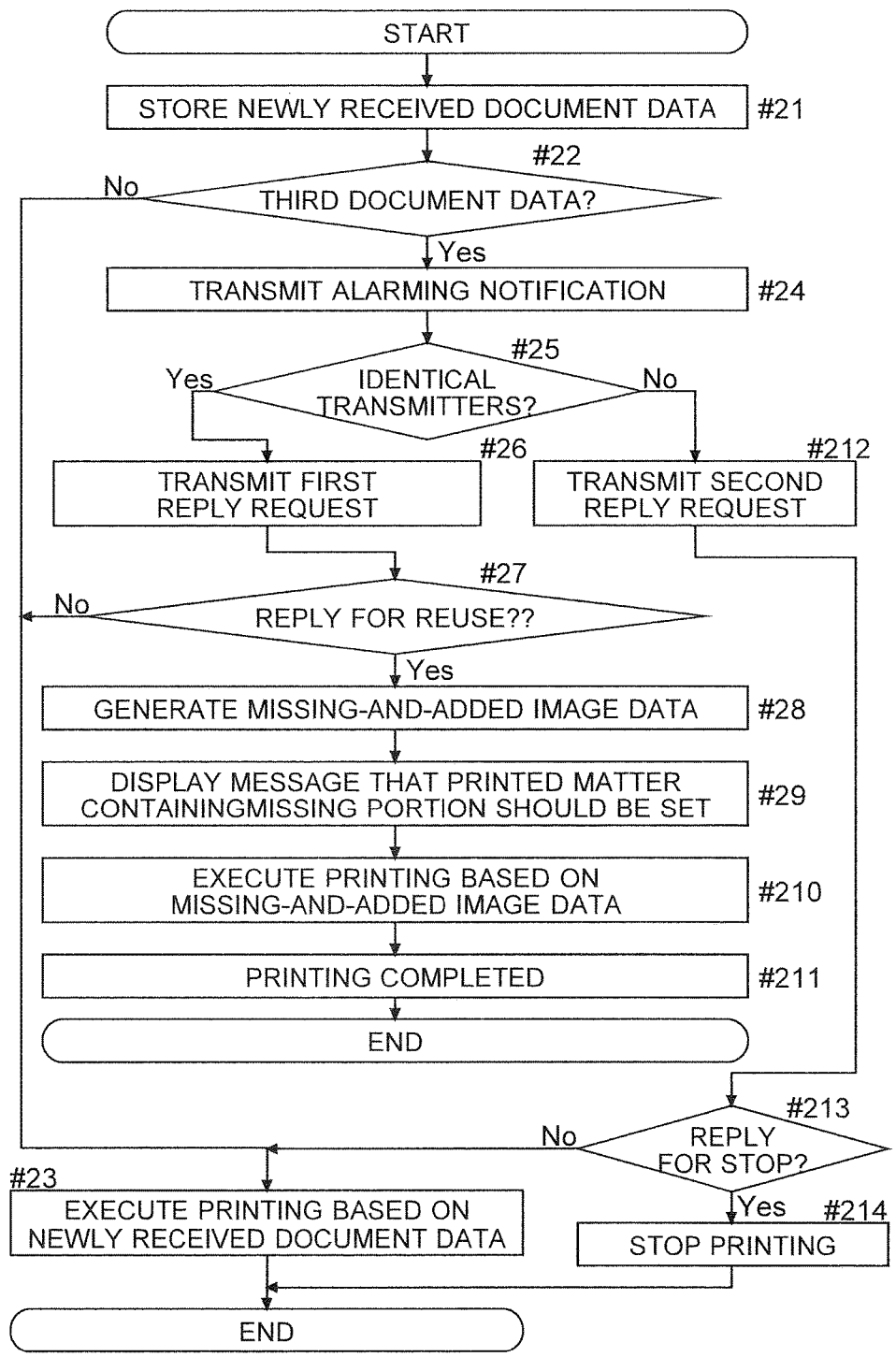
FIG. 10 is a flowchart showing an example of processing by a multifunction peripheral with the economy mode canceled according to the embodiment.

Next, an example of processing by the multifunction peripheral 100 with the economy mode canceled according to this embodiment will be described with reference to FIG. 10.

The economy mode allows only missing information to be added to already printed paper sheets. With the economy mode canceled, in principle, the control unit 1 does not select the first document data 81. With the economy mode canceled, the control unit 1 prints out entire contents of received document data 8 onto new paper sheets. However, there are some cases in which printed paper sheets can be reused. There are other cases in which the user fails to set the economy mode. With the economy mode canceled, the control unit 1 allows printed paper sheets to be reused as much as possible.

Hereinbelow, an example of the processing flow with the economy mode canceled will be described with reference to FIG. 10. A start in FIG. 10 is a time point when the document data 8 is received with the economy mode canceled. First, the control unit 1 makes newly received document data 8 stored in the storage unit 2 in nonvolatile fashion (step #21). Next, the control unit 1 checks whether or not the newly received document data 8 is third document data (step #22). In this case, the third document data is document data 8 having the same name as a piece of document data 8 stored in the storage unit 2, out of the document data 8 newly received by the communication unit 6. In other words, the control unit 1 checks whether or not a piece of document data 8 having the same name as the newly received document data 8 has been stored in the storage unit 2.

Upon a decision as non third document data (No at step #22), the control unit 1 instructs the printing part 5 to carry out printing based on the newly received document data 8 (step #23). At step #23, printing is executed with use of new paper sheets. After the step #23, this processing flow is ended (END).

Upon a decision as the third document data (Yes at step #22), the control unit 1 instructs the communication unit 6 to transmit an alarming notification toward the computer 7 (transmitter) that has transmitted the third document data (step #24). The alarming notification is data for notifying that document data 8 having the same name as the third document data has previously been printed. When the alarming notification is received, the processing unit 70 makes the display 72 display a message that document data 8 having the same name as the third document data has previously been printed. This allows the user to be notified that there is a possibility that printed paper sheets can be reused.

The control unit 1 checks whether or not a transmitter of the third document data and a transmitter of any piece of document data 8 having the same name as the third document data and stored in the storage unit 2 are identical to each other (step #25). Based on transmitter information 8*d* contained in the individual pieces of document data 8, the control unit 1 checks whether or not those transmitters (computers 7) are identical to each other.

When the transmitters are identical to each other (Yes at step #25), the control unit 1 instructs the communication unit 6 to transmit a first reply request (step #26). Based on the transmitter information 8*d* contained in the third document data, the control unit 1 determines an address of the first reply request. The address is the computer 7 (network communication unit 74) that has transmitted the third document data. The first reply request is a notification that requests a reply as to whether or not the printed matter is reused.

The processing unit 70 of the computer 7 that has received the first reply request displays a measuring on the display 72. This message gives a notification that a piece of document data 8 having the same name as the third document data has previously been transmitted from the same computer 7 and printed. Further, the processing unit 70 makes a reply-dedicated button displayed on the display 72. For example, the processing unit 70 makes a reuse button and a no-reuse button displayed. The user may operate these buttons to determine a reply content.

The control unit 1 checks whether or not a reply for execution of printing by reusing a printed matter has been made (step #27). More specifically, the control unit 1 checks a reply from the transmitter (computer 7) of the third document data. When the input device 73 has accepted an operation of the reuse button, the processing unit 70 instructs the network communication unit 74 to transmit, toward the communication unit 6, a reply for reuse. Upon receiving the reply for reuse, the control unit 1 recognizes that the reply indicates execution of printing by reusing the printed matter (Yes at step #27).

Meanwhile, when the input device 73 has accepted an operation of the no-reuse button, the processing unit 70 instructs the network communication unit 74 to transmit a message for no reuse toward the communication unit 6. Upon receiving the message of no reuse, the control unit 1 recognizes that a reply for no reusing any printed matter has been made (No at step #27).

When a reply of no reusing any printed matter is made (No at step #27), the processing flow moves on to step #23. Meanwhile, when a reply of reusing a printed matter is made (Yes at step #27), the control unit 1 generates missing-and-added image data i1 for printing of only the missing portion P1 (step #28, similar to step #18). In this case, the control unit 1 assigns, as the first document data 81, a piece of document data 8 which has been stored in the storage unit 2 and which has the same name as the third document data. Also, the control unit 1 treats the third document data as the second document data 82. The control unit 1 makes a comparison between both pieces of document data 8 to each other to generate the missing-and-added image data i1.

The control unit 1 instructs the display panel 41 to display a message that a printed matter containing the missing portion P1 (printed matter of the first document data 81) should be set (step #29, similar to step #19). The control unit 1 may instruct the display panel 41 to display a printing start button together with the message. Even when the user has failed to set the printed matter of reuse on the sheet feed unit 51, the user can be aware of the failure.

Then, the control unit 1 instructs the printing part 5 to execute printing based on the missing-and-added image data i1 (step #210, similar to step #110). More specifically, the control unit 1 instructs the sheet feed unit 51 to feed paper sheets of the printed matter of reuse set on the sheet feed unit 51. Also, the control unit 1 instructs the image forming part 53 to form a toner image based on the missing-and-added image data i1 and transfer the toner image onto the printed matter. The fixing unit 55 makes the toner image of the missing portion P1 fixed onto the printed matter. As a result, a printed matter in which the missing portion P1 has been added can be obtained. Then, printing onto the printed matter of reuse is completed (step #211, similar to step #111). Thus, the processing flow is ended (END).

Upon a decision of different transmitters (No at step #25), the control unit 1 instructs the communication unit 6 to transmit a second reply request (step #212). Based on the transmitter information 8*d* contained in the third document data, the control unit 1 determines an address of the second reply request. The address is the computer 7 (network communication unit 74) that has transmitted the third document data. The second reply request is a notification that requests a reply as to whether or not printing based on the third document data is stopped.

There are some cases where a plurality of persons cooperatively prepare one document. One of those cooperative persons, who is unaware that the document has already been printed, may execute printing. In this case, redundant (more than necessary) printing is executed. Redundant document printing is wasteful. Therefore, the control unit 1 gives a notification that the same document has already been printed.

Upon receiving the second reply request, the processing unit 70 of the computer 7 displays a message on the display 72. This message notifies that a piece of document data 8 having the same name as the third document data has previously been transmitted from another computer 7. The message also notifies that the document has already been printed. The processing unit 70 instructs the display 72 to display a reply-dedicated button. For example, the processing unit 70 makes a stop button and a continue button displayed. The user may operate these buttons to determine a reply content.

The control unit 1 checks whether or not a reply for stopping printing based on the third document data has been made (step #213). More specifically, the control unit 1 checks a reply from the transmitter (computer 7) of the third document data. When the input device 73 has accepted an operation of the continue button, the processing unit 70 instructs the network communication unit 74 to transmit a reply for continuation of printing toward the communication unit 6. Upon receiving the reply for continuation of printing (No at step #213), the processing flow moves on to step #23. Then, the processing flow is ended (END).

Meanwhile, when the input device 73 has accepted an operation of the stop button, the processing unit 70 instructs the network communication unit 74 to transmit a reply for stop of printing toward the communication unit 6. Upon receiving the reply for stop of printing, the control unit 1 recognizes that a reply for stop of printing has been made (Yes at step #213). Then, the control unit 1 stops the printing based on the third document data (step #214). Thus, the processing flow is ended.

Conventionally, in an event of misprint, new paper sheets and color materials would be consumed to print a corrected document. That is, printing would be redone. Printed matters with necessary information missing would be discarded, and not reused. Therefore, the image forming apparatus (multi-function peripheral 100) according to this embodiment includes a communication unit 6, a printing part 5, a storage unit 2, an operation part (touch panel 42, hard keys 43), and a control unit 1. The communication unit 6 receives document data 8. The printing part 5 includes a sheet feed unit 51 for feeding out paper sheets on a sheet-by-sheet basis. Based on document data 8, the printing part 5 performs printing on a sheet fed from the sheet feed unit 51. The storage unit 2 stores, in nonvolatile fashion, document data 8 received by the communication unit 6. The operation part accepts an operation. With the economy mode set, the control unit 1 selects, out of pieces of document data 8 stored in the storage unit 2, one piece of document data 8 as first document data 81. The control unit 1 makes a comparison between the first document data 81 and second document data 82 newly received by the communication unit 6. The control unit 1 recognizes, out of the second document data 82, a missing portion P1 that is present in the second document data 82 but absent in the first document data 81. The control unit 1 generates missing-and-added image data i1 for printing of only the missing portion P1. The control unit 1 instructs the sheet feed unit 51 to feed sheets of a set printed matter based on the first document data 81, and further instructs the printing part 5 to perform printing based on the missing-and-added image data i1.

As a result of this, only by setting a printed matter of reuse (a printed matter containing a missing portion P1, a printed matter based on the first document data 81) onto the sheet feed unit 51, it is implementable to add missing information (information added to the second document) to the printed matter of reuse. It is allowable to reuse a misprinted matter. No new sheets of paper are consumed to obtain a corrected printed matter. Also, only the missing portion P1 is printed. Color material consumption can be reduced in comparison to the case of reprinting a whole page based on the second document data 82. Wasteful consumption of paper sheets and color materials can be reduced. It is made practicable to provide an economy image forming apparatus.

Also, the control unit 1 selects, as the first document data 81, a piece of document data 8 having the same name as a document data name 8c of the second document data 82, from among pieces of document data 8 stored in the storage unit 2. It is made possible to automatically select first document data 81 corresponding to the second document data 82.

When the communication unit 6 has received designation data for designating document data 8 stored in the storage unit 2, the control unit 1 selects, as first document data 81, the document data 8 designated by the designation data. As a result, the designated document data 8 can be treated as the first document data 81. The user is allowed to select a piece of document data 8 treated as the first document data 81 from among the pieces of document data 8 stored in the storage unit 2.

The control unit 1 also selects, as the first document data 81, a piece of document data 8 designated by an operation of the operation part. As a result of this, the user is allowed to select a piece of document data 8 treated as the first document data 81 from among the pieces of document data 8 stored in the storage unit 2.

When the second document data 82 has another piece of document data 8 attached thereto, the control unit 1 selects, as first document data 81, the another piece of document data 8 attached to the second document data 82. The control unit 1 does not select first document data 81 from among the pieces of document data 8 stored in the storage unit 2. As a result of this, the first document data 81 can be set only by attaching uncorrected document data 8 to the second document data 82. It is easily implementable to set the first document data 81.

Furthermore, the image forming apparatus includes an image reading unit 3 for reading a document and generating document image data. When the operation part has accepted an instruction for comparison with the document image data, the control unit 1 selects the document image data as the first document data 81. The control unit 1 makes a comparison between comparison-dedicated image data based on the second document data 82 and the document image data. The control unit 1 recognizes, as the missing portion P1, a portion of the comparison-dedicated image data that is present in the comparison-dedicated image data but absent in the document image data. The control unit 1 generates missing-and-added image data i1 for printing of only the missing portion P1. The control unit 1 instructs the printing part 5 to execute printing based on the missing-and-added image data i1. As a result of this, it is implementable to make a comparison between image data of a document read by the scanner (image reading unit 3) of the image forming apparatus and the second document data 82. By making a misprinted document read out, it is made possible to add missing information to the document (a printed matter of reuse).

Furthermore, the control unit 1 instructs the storage unit 2 to erase pieces of document data 8 that have reached expiration of a predetermined hold duration since their transmission. As a result of this, it is made possible to prevent the storage area from being filled with pieces of document data 8. It is made possible to prevent the storage area from being chocked with pieces of document data 8.

When the first document data 81 and the second document data 82 are identical to each other, the control unit 1 suppresses the printing based on the missing-and-added image data i1 by the printing part 5, and gives a notification that the first document data 81 and the second document data 82 are identical to each other. As a result of this, it is implementable to make it known that printing based on document data 8 on which no correction has been reflected is going to be executed. It is implementable to reduce wasteful printing.

Also, with no setting to the economy mode, when the communication unit 6 has received third document data having the same name as a piece of document data 8 stored in the storage unit 2, the control unit 1 instructs the communication unit 6 to transmit, toward the transmitter of the third document data, an alarming notification for notifying that a piece of document data 8 having the same name as the third document data has previously been printed. As a result of this, it is implementable to notify the user of a possibility that consumption of paper sheets and color materials can be reduced.

In the case where the transmitter of the third document data and the transmitter of a piece of document data 8 having the same name as the third document data and stored in the storage unit 2 are identical to each other, when the communication unit 6 has received a reply for reuse of a printed matter from the transmitter of the third document data subsequent to transmission of an alarming notification, the control unit 1 generates missing-and-added image data i1 while taking the piece of document data 8 having the same name as the third document data as the first document data 81, as well as taking the third document data as the second document data 82. The control unit 1 instructs the printing part 5 to execute printing based on the missing-and-added image data i1. As a result of this, even with no setting to the economy mode, it is implementable to add necessary information to an already-printed document. It is implementable to reuse a misprinted matter.

After one person has printed a document, another person may print out the same document. As a result, more than necessary quantity of the document may be printed. Therefore, in the case where the transmitter of the third document data and the transmitter of the piece of document data 8 having the same name as the third document data and stored in the storage unit 2 are different from each other, when the communication unit 6 has received a reply for stop of printing from the transmitter of the third document data subsequent to transmission of an alarming notification, the control unit 1 blocks the printing part 5 from executing printing based on the third document data. As a result of this, the transmitter of the third document data can be notified of a possibility that the same document has already been printed by another person. The transmitter can be notified of a possibility that wasteful printing is going to be executed. The transmitter of the third document data can be promoted to ascertain the necessity of printing. Unnecessary printing of a document can be prevented.

The present disclosure may also be construed as an image forming system including an image forming apparatus and a computer. Also, although an embodiment of the disclosure has been fully described hereinabove, yet the disclosure is not limited to the scope of this description and may be modified in various ways unless those modifications depart from the gist of the disclosure.

What is claimed is:

1. An image forming apparatus comprising:
    a communication unit for receiving document data;
    a printing part which includes a sheet feed unit for feeding out sheets of paper one by one and which performs printing on a sheet fed from the sheet feed unit on a basis of the document data;
    a storage unit for storing therein, in nonvolatile fashion, the document data received by the communication unit;
    an operation part for accepting an operation; and
    a control unit for:
    with an economy mode set,
        selecting, as first document data, one piece of the document data out of pieces of the document data stored in the storage unit;
        making a comparison between the first document data and second document data newly received by the communication unit;
        recognizing a missing portion out of the second document data that is present in the second document data but absent in the first document data;
        generating missing-and-added image data for printing of only the missing portion; and
        instructing the sheet feed unit to feed a set printed matter based on the first document data, and instructing the printing part to execute printing based on the missing-and-added image data.

2. The image forming apparatus according to claim 1, wherein
    the control unit selects, as the first document data, a piece of the document data having a same name as the second document data out of the pieces of the document data stored in the storage unit.

3. The image forming apparatus according to claim 1, wherein
    when the communication unit has received designation data for designating a piece of the document data stored in the storage unit,
    the control unit selects, as the first document data, the piece of the document data designated by the designation data.

4. The image forming apparatus according to claim 1, wherein
    the control unit selects, as the first document data, a piece of the document data designated by an operation of the operation part.

5. The image forming apparatus according to claim 1, wherein
    when another piece of the document data is attached to the second document data, the control unit
        selects, as the first document data, the another piece of the document data attached to the second document data, and
        does not select the first document data from among the pieces of the document data stored in the storage unit.

6. The image forming apparatus according to claim 1, further comprising
    an image reading unit for reading a document and generating document image data, wherein when the operation part has accepted an instruction for comparison with the document image data, the control unit selects the document image data as the first document data, makes a comparison between comparison-dedicated image data based on the second document data and the document image data, recognizes, as the missing portion, a portion of the comparison-dedicated image data that is present in the comparison-dedicated image data but absent in the document image data, generates the missing-and-added image data for printing of only the missing portion, and instructs the printing part to execute printing based on the missing-and-added image data.

7. The image forming apparatus according to claim 1, wherein the control unit instructs the storage unit to erase pieces of the document data that have reached expiration of a predetermined hold duration since their transmission.

8. The image forming apparatus according to claim 1, wherein when the first document data and the second document data are identical to each other, the control unit gives a notification that the first document data and the second document data are identical to each other, without instructing the printing part to execute printing based on the missing-and-added image data.

9. The image forming apparatus according to claim 1, wherein in a case where the mode is not set to the economy mode, when the communication unit has newly received third document data having a same name as a piece of the document data stored in the storage unit, the control unit instructs the communication unit to transmit, toward a transmitter of the third document data, an alarming notification for notifying that a piece of the document data having the same name as the third document data has previously been printed.

10. The image forming apparatus according to claim 9, wherein in a case where the transmitter of the third document data and a transmitter of the piece of the document data having the same name as the third document data and stored in the storage unit are identical to each other, when the communication unit has received a reply for reuse of a printed matter from the transmitter of the third document data subsequent to transmission of the alarming notification, the control unit generates the missing-and-added image data on a basis that the piece of the document data having the same name as the third document data is taken as the first document data while the third document data is taken as the second document data, and instructs the printing part to execute printing based on the missing-and-added image data.

11. The image forming apparatus according to claim 9, wherein in a case where the transmitter of the third document data and a transmitter of the piece of the document data having the same name as the third document data and stored in the storage unit are different from each other, when the communication unit has received a reply for stop of printing from the transmitter of the third document data subsequent to transmission of the alarming notification, the control unit blocks the printing part from executing printing based on the third document data.

12. A control method for an image forming apparatus comprising:

receiving document data;

feeding out sheets of paper one by one;

executing printing on a fed sheet based on the document data;

storing the received document data in nonvolatile fashion;

accepting an operation;

with an economy mode set, selecting, as first document data, one piece of the document data out of pieces of the stored document data;

making a comparison between the first document data and newly received second document data;

recognizing, out of the second document data, a missing portion that is present in the second document data but absent in the first document data;

generating missing-and-added image data for printing of only the missing portion; and feeding a set printed matter based on the first document data, and executing printing based on the missing-and-added image data.

* * * * *